Jan. 9, 1962   H. R. VOIGT   3,015,972
VARIABLE SPEED DRIVE
Filed Jan. 26, 1959   9 Sheets-Sheet 1

INVENTOR.
Hellmut R. Voigt
BY

INVENTOR.
Hellmut R. Voigt
BY
Atty

Jan. 9, 1962

H. R. VOIGT 3,015,972

VARIABLE SPEED DRIVE

Filed Jan. 26, 1959

INVENTOR.
Hellmut R. Voigt
BY Alberto J. Fihe
Attys

Jan. 9, 1962 H. R. VOIGT 3,015,972
VARIABLE SPEED DRIVE
Filed Jan. 26, 1959 9 Sheets-Sheet 6

INVENTOR.
Hellmut R. Voigt
BY
Albert J. Fihe
Attys

INVENTOR.
Hellmut R. Voigt
BY Albert J Fihe
Attys

Jan. 9, 1962 H. R. VOIGT 3,015,972
VARIABLE SPEED DRIVE
Filed Jan. 26, 1959 9 Sheets-Sheet 9

HELLMUT R. VOIGT
INVENTOR.

BY
atty

United States Patent Office 3,015,972
Patented Jan. 9, 1962

3,015,972
VARIABLE SPEED DRIVE
Hellmut R. Voigt, Engineer M.S., 11821 Redbank St., Sun Valley, Calif.
Filed Jan. 26, 1959, Ser. No. 789,123
6 Claims. (Cl. 74—793)

This invention relates to a variable speed transmission.

One of the principal objects of this invention is the provision of a device of the class described which will produce an adjustable speed ratio over an almost infinite range and which comprises a very high degree of efficiency.

Another important object of this invention is to eliminate complex hydraulic, pneumatic and electrical components in this pure mechanical speed changer which is simple in design, economical of manufacture, easy of operation, readily maintained and furthermore provides complete and ready repair or replacement of all structural parts.

A further important object of this invention is the provision of a mechanical, variable, positive drive speed transmission which combines the advantages of the usual multiple gear transmission, together with the further advantages of previously constructed and well known infinitely variable speed drives, such as hydraulic transmissions and other fluid-power systems, adjustable pulley transmissions comprising variable pitch V-belt sheaves, conical friction gears, electric motor generator sets and adjustable speed electric motor drives.

Another and still further important object of this invention resides in the construction of a variable speed drive, having unlimited non-slip power and torque transmission possibilities.

Yet another object of the invention is the provision of an infinitely variable speed transmission which can be adjusted, while the machine is in operation and which includes zero speed and a subsequent reversed direction of rotation.

Other important objects of the invention will be apparent from the disclosures in the accompanying drawings and following specification.

The invention, in a preferred form, is illustrated in the drawings, and hereinafter more fully described.

Figure 1A:
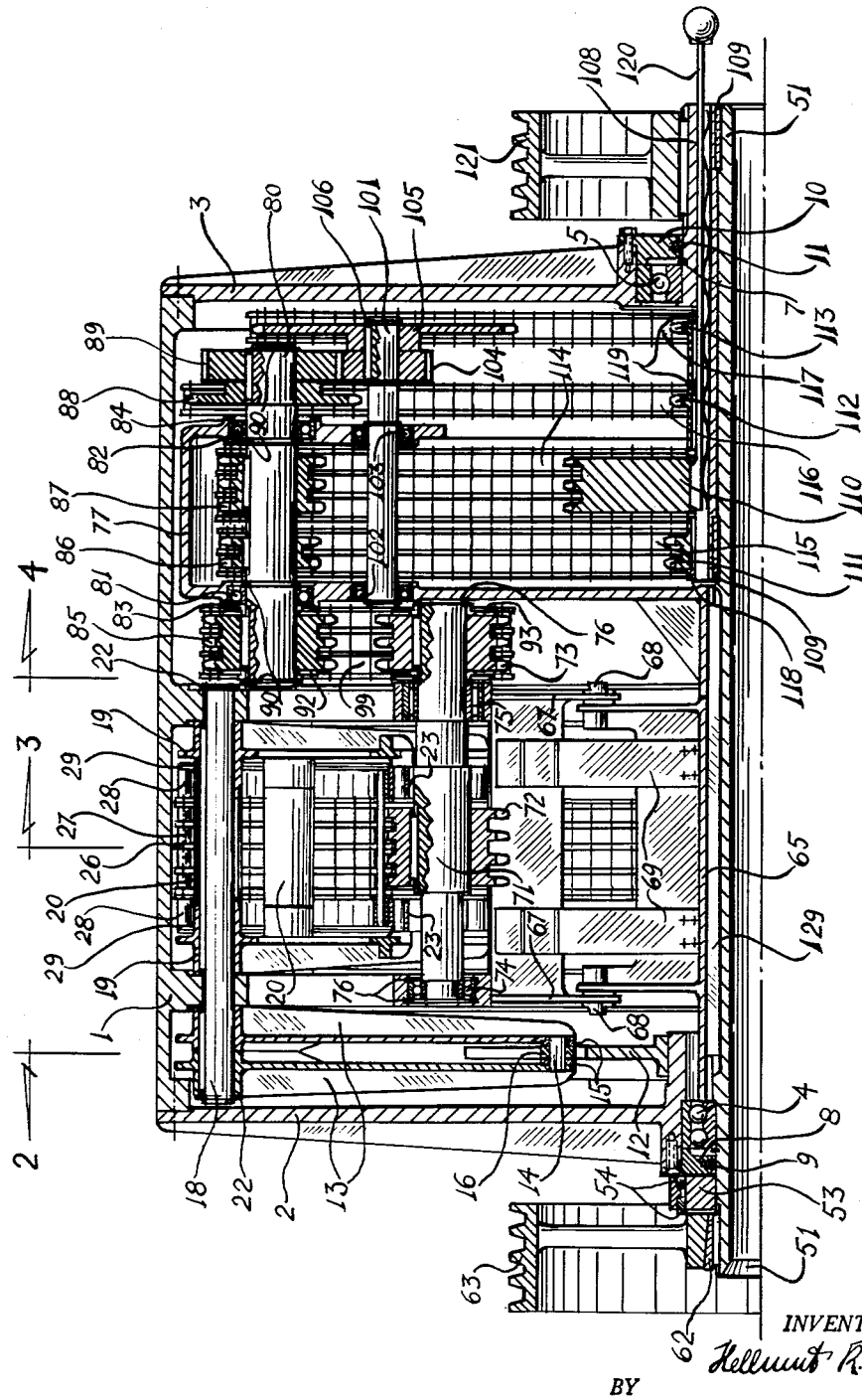
FIGURE 1A is a sectional view of a typical embodiment of the variable speed transmission of this invention, and shows the upper half of the structure.
Figure 1B:
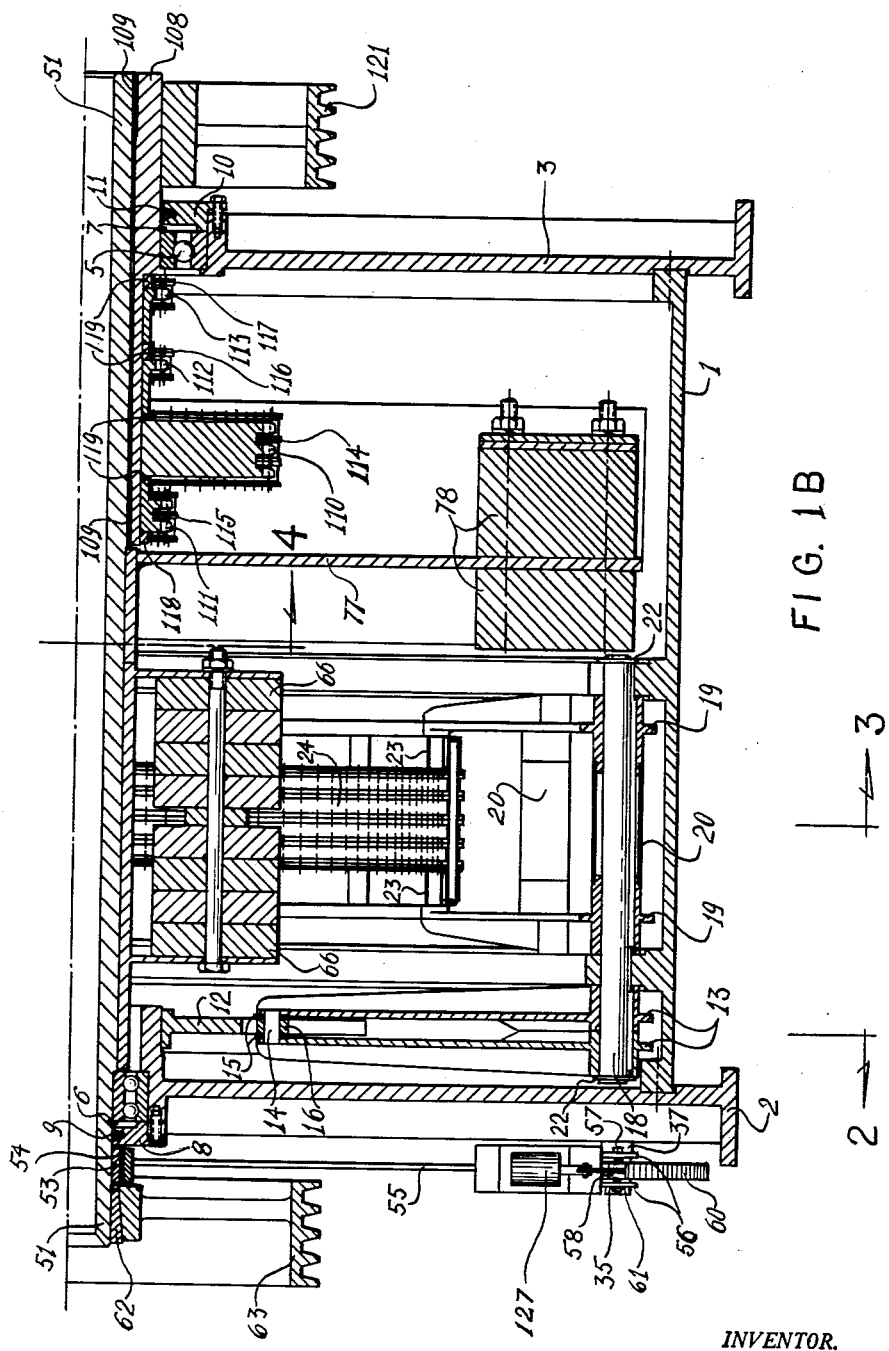
FIGURE 1B is a sectional view of the invention, showing the lower half of the structure.

The reference numeral 1 indicates generally a housing preferably cylindrical provided with a rear cover 2, a front cover 3, and these covers include bearings 4 and 5, which receive the main shaft assembly 51 (FIGURES 1A and 1B). There are two bearing retainers 6 and 7, a rear bearing cover 8 provided with an oil seal 9, a front bearing cover 10 which includes an oil seal 11.

Inside the housing adjacent the rear cover 2 a controlling mechanism is installed comprising a controlling disc 12, (FIG. 2) twelve pairs of control levers 13, twelve pins 14, twenty-four washers 15 (FIGURES 1A and 1B), twelve slides 16 (FIGURE 2), a plurality of springs 17, twelve pivot shafts 18 (FIGURES 1A and 1B), twelve pairs of support levers 19 (FIGURE 3), eleven rollers 20 (FIGURES 1B and 3), two idler double sprockets 21, twenty-four retainers 22 (FIGURES 1A and 1B), twelve pairs of leaf springs 23 (FIGURES 3, 7, 8) and a chain track assembly 24 (FIGURES 1B, 3, 7 and 8).

As best shown in FIGURES 1A, 1B, 3 and 5 to 8 this chain track assembly consists of a plurality of chain pins 25, chain side bars 26, chain rollers 27, support rollers 28, retainers 29, connecting loops 30, connecting screws 33, cable terminals 31, steel cables 32 and a chain feed mechanism 38.

The chain feed mechanism 38 comprises a pair of side plates 39, a pair of pivot pins 40 (FIGURE 8), a pair of pin blocks 41, a transition chain pin 42, a pair of bushings 43 (FIGURE 7), a ratchet shaft 44 (FIGURES 3 and 8), a pair of feed sprockets 45 (FIGURES 3, 5 and 7), a control pawl 46 (FIGURES 3, 5 and 8), a pair of preload springs 47 (FIGURE 5), a pair of rocker arms 48 (FIGURES 5 and 6), two cam rollers 49 for the rocker arms and two cam roller release springs 50.

As best shown in FIGURES 9, 10, 1A and 1B a chain take-up mechanism is provided for the chain track 24 comprising a cable drum 34 (FIGURE 10), a drum supporting shaft 35, a preload helical spring 36 which surmounts shaft 35, a sleeve bearing 37 for said shaft, a spur gear 60 fixed to said shaft, a pair of swing levers 56 pivoted on said shaft, a pawl 58 with a pawl release spring 59 attached to said swing levers by the pivot pin 57 and a retainer 61 (FIGURE 1B), an eccentric 53 fixed to the rear outer end of the hollow main shaft 51, a sleeve bearing 54 and a connector arm 55 and a solenoid 127 which acts on the pawl 58.

The driving pulley 63 (FIGURES 1A and 1B) is fixed also to the rear outer end of the main shaft 51 by an adapter 62.

Figure 3:
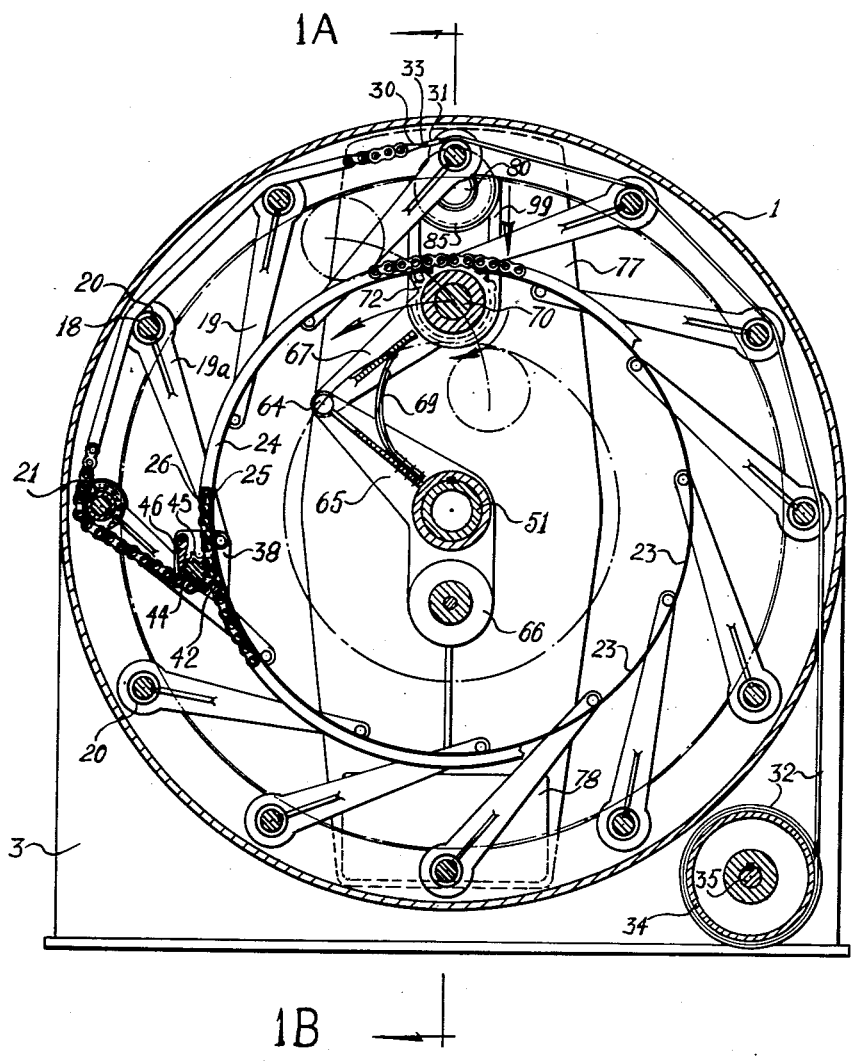
FIGURE 3 is a section on the lines 3—3 of FIGURES 1A and 1B illustrating the chain track mechanism.

As best shown in FIGURES 3, 1A and 1B a knee action lever assembly 64 carrying the planetary shaft assembly 70 consists of a double lever 65 having a counter weight 66, which is keyed to the main shaft 51 by a key 129, a pair of links 67, which are pivotally connected to said double lever by two wrist pins 68 (FIGURE 1A) and a pair of expanding leaf springs 69.

Said planetary shaft assembly 70 of the primary planetary transmission (FIGURES 1A and 3) comprises a planetary shaft 71 two sprockets 72 and 73 fixed to said shaft, two bearings 74 and 75 for the shaft and four retainers 76.

As shown in FIGURES 1A, 1B and 3 a secondary planetary transmission is provided which comprises a satellite carrier 77, which includes a counter weight 78, a planetary shaft assembly 79, which consists of a planetary shaft 80 supported by two bearings 81 and 82, sprockets 85, 86, 87, 88 and a spur gear 89 fixed to said shaft and retainers 83, 84 and 90, a countershaft assembly 100 comprising a countershaft 101 supported by bearings 102 and 103, a spur gear 104 fixed to said shaft and engaging the said spur gear 89, a sprocket 105 fixed to said shaft and four retainers 106.

Said sprockets 85, 86, 87, 88 and 105 are connected by roller chains 114, 115, 116 and 117 with the corresponding sprockets 110, 111, 112 and 113, which are turnably mounted on a tubular output shaft 108 which surmounts the main shaft 51 by means of two sleeve bearings 109. A collar 118 and four spacers 119 locate the sprockets 110 to 113 on said output shaft; and a selector key 120 is embedded in said output shaft and an output or driven pulley 121 is keyed to the front outer shaft.

Figure 4:
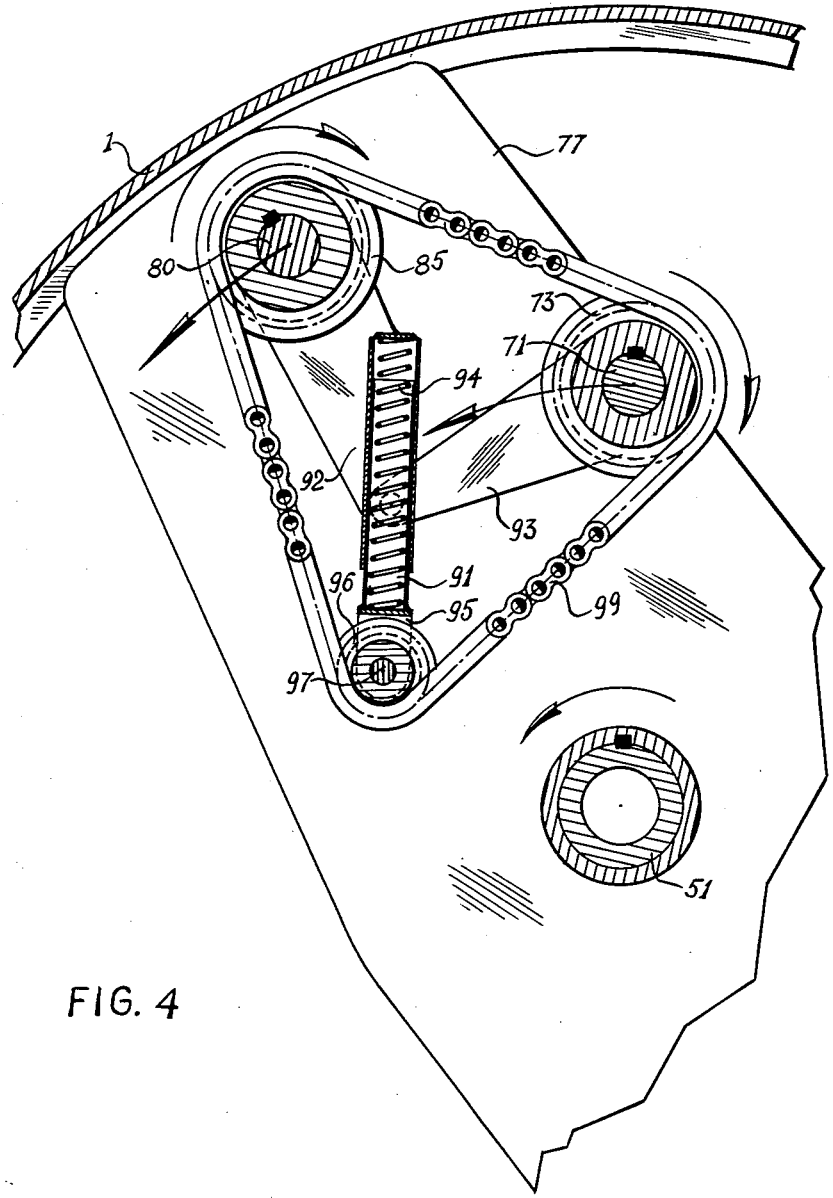
FIGURE 4 is an enlarged section taken on the lines 4—4 of FIGURE 1A and a portion of FIGURE 1B, showing the chain drive which connects the planetary shafts of the primary and the secondary planetary transmission.
Figure 5:
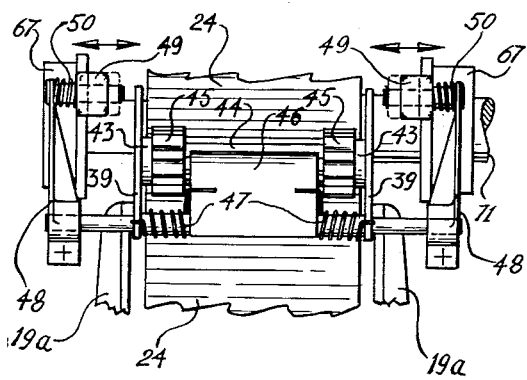
FIGURE 5 is a plan view of the chain feed mechanism.
Figure 7:
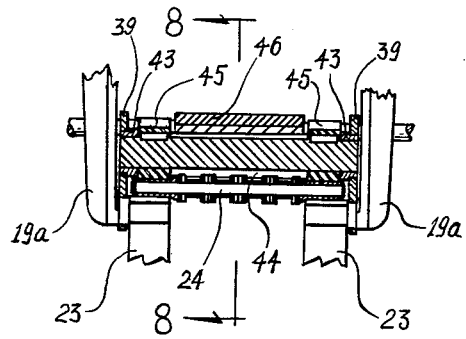
FIGURE 7 is a sectional view of the chain feed mechanism.

As illustrated in FIGURES 4, 1A and 3 a chain drive with a chain tightener assembly connects the primary and secondary planetary transmission, which comprises an idler arm 92 pivotally mounted on shaft 80, two links 93 pivotally mounted on shaft 71 and pivotally connected to the idler arm 92 at their respective ends, an idler fork 95, which is guided in a tubular housing connected to the idler arm 92, a helical spring 94, which pushes the idler fork 95 outwardly, an idler sprocket 96 mounted on a pin 97 in the idler fork 95 and a roller chain encircling the sprockets 85, 73 and 96.

In operation the main shaft 51 of the variable speed transmission is rotated by any convenient type of a prime mover via a V-belt and the driving pulley 63; and in counter clockwise direction as indicated by arrow in FIGURE 3 and with a constant speed of approximately 120 r.p.m. The double lever 65 with its counter weight 66 being keyed to the main shaft 51 and the satellite carrier 77 (FIGURES 1B and 4) turn with said shaft. The links 67 pivoted to said double lever at 64 by the lugs 68 (FIGURE 1A) tends to swing outwards by reason of the pressure of the two leaf springs 69, which are mounted on the lever 65 and exert a sliding contact pressure on the links 67. Said pressure and centrifugal forces developed during operation of the transmission maintain the sprocket 72 permanently engaged into the circular chain track 24. When the transmission is under load the tension of the chain 99 of the chain drive 91 further insure the engagement of the sprocket 72.

The circular chain track 24 is formed by the support levers 19 cooperating with the leaf springs 23 (FIGURE 3), each of said leaf springs is pivotally mounted on an integral protuberance 128 (FIGURES 3, 7 and 8) at their inner end of its respective support lever 19 and which overlap each other, as best shown in FIGURE 3, thereby forming a pair of parallel circular tracks with the roller chain 24 completely and snugly encircling said tracks. Said chain rests with support rollers 28 (FIGURE 1A) surmounting its protruding pins 25 on the leaf spring tracks. The concentricity of the chain track is assured by the control disc 12 (FIGURE 2), which is pivoted on the hub of the rear housing cover 2. This control disc has twelve equally spaced radial slots with a slide 16 in each slot. Pins 14 connect each slide with a pair of control levers 13, each of which is keyed to a pivot shaft 18. The shafts 18 are pivotally mounted in circular ribs of the housing 1, spaced equally and concentrically. Similarly, the twelve pairs of support levers 19 (FIGURE 3) are keyed to the pivot shafts 18, thereby providing a direct and positive connection between the support levers 19 and the control levers 13, which in turn are positioned in the control disc 12. Accordingly, all the levers 13 and 19 being properly set and keyed to the pivot shafts 18, the free ends of the support levers 19 will be located on a circle with its center at the center of the transmission, thereby assuring the centricity and concentricity of the chain track 24. The concentricity is supplemented by the proper shape and dimensions of the overlapping arcuate leaf springs 23 and the tension of the chain 24 caused by the springs 17 (FIGURE 2), which act on the control levers 13 and further supplemented by the pull on the chain 24 caused by the torque of the sprocket 72 when a load is placed on the transmission. The greater the torque transmitted by the transmission, the more the planetary sprocket 72 resists turning, which causes a pull on the chain 24, said pull being transmitted over the chain feed mechanism 38 and the support levers 19a to the control disc 12 and from there back to the eleven pairs of support levers 19, strenghtening the action of the springs 17.

The engagement of the sprocket 72 into the chain track 24 forces a clockwise rotation thereof as indicated by the smaller arrow in FIGURE 3. This auto rotation of the sprocket 72 is determined by the diameter of the chain track 24 and varies accordingly. For example, a pitch diameter ratio between the sprocket 72 and the chain track 24 of 1:4 minimum to 1:8 maximum and with a speed of the main shaft 51 of 120 r.p.m., the sprocket 72 will turn with a speed of between 480 to 960 r.p.m.

The change of the chain track diameter results from the take-up of chain links from respective feeding chain links into the chain track circle, one chain link at each revolution of the main shaft 51. This is accomplished by the chain take-up mechanism shown in FIGURES 1B, 9 and 10, respective by the chain feed mechanism 38 shown in FIGURES 3 and 5 to 8.

Referring to FIGURES 5 to 8 it will be noted that the side plates 39 of the feed mechanism are pivoted to the pair of support levers 19a and attached to the side plates 39 by means of pins 40 and blocks 41 is the fixed end of the chain 24. Pivoted in the side plates 39 is a ratchet shaft 44 with two feed sprockets 45 fixed to it, one at each end and with an operating pawl 46 fixed in between the sprockets. Proper positioning of the ratchet shaft, the feed sprockets and the pawl and suitable cooperation between these parts assures a proper pitch relationship between the fixed and the free end of the chain 24 at the interruption point. The said feed sprockets 45 are engaged in the support rollers 28 of the chain 24. Rocker arms 48 are clamped to the both ends of the pawl axis which protrudes beyond the side plates 39 and cam rollers 49 are slidably fitted over pins at the free ends of said rocker arms and held in position by release springs 50.

Figure 6:
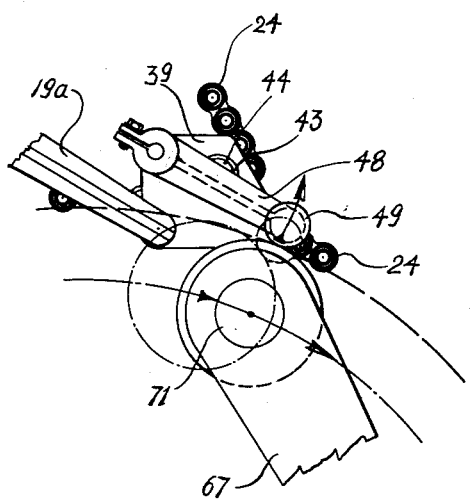
FIGURE 6 is an end view of the chain feed mechanism.
Figure 8:
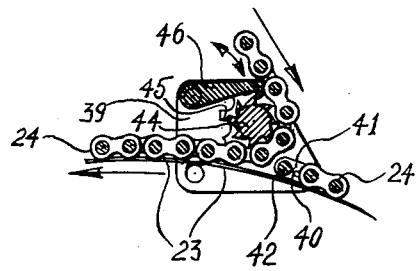
FIGURE 8 is a sectional view of the chain feed mechanism taken on the lines 8—8 of FIGURE 7.

In order to increase the pitch circle of the chain track by one chain link at one time, the cam rollers 49 (FIGURE 5) are pushed either manually by means of a control cable or by the action of a solenoid against the release springs 50 in their outermost position where they contact the bearing housings of the double lever links 67 (FIGURE 6). This interference releases the pawl 46 by lifting it up and the chain track 24, always under tension pulls an additional chain link into the chain track circle and the pawl 46 then contacts and catches the next tooth of the ratchet shaft 44, setting a new true pitch at the interruption of the chain 24. This results in a slight speeding up of the auto rotation of the planetary shaft 71.

Figure 9:
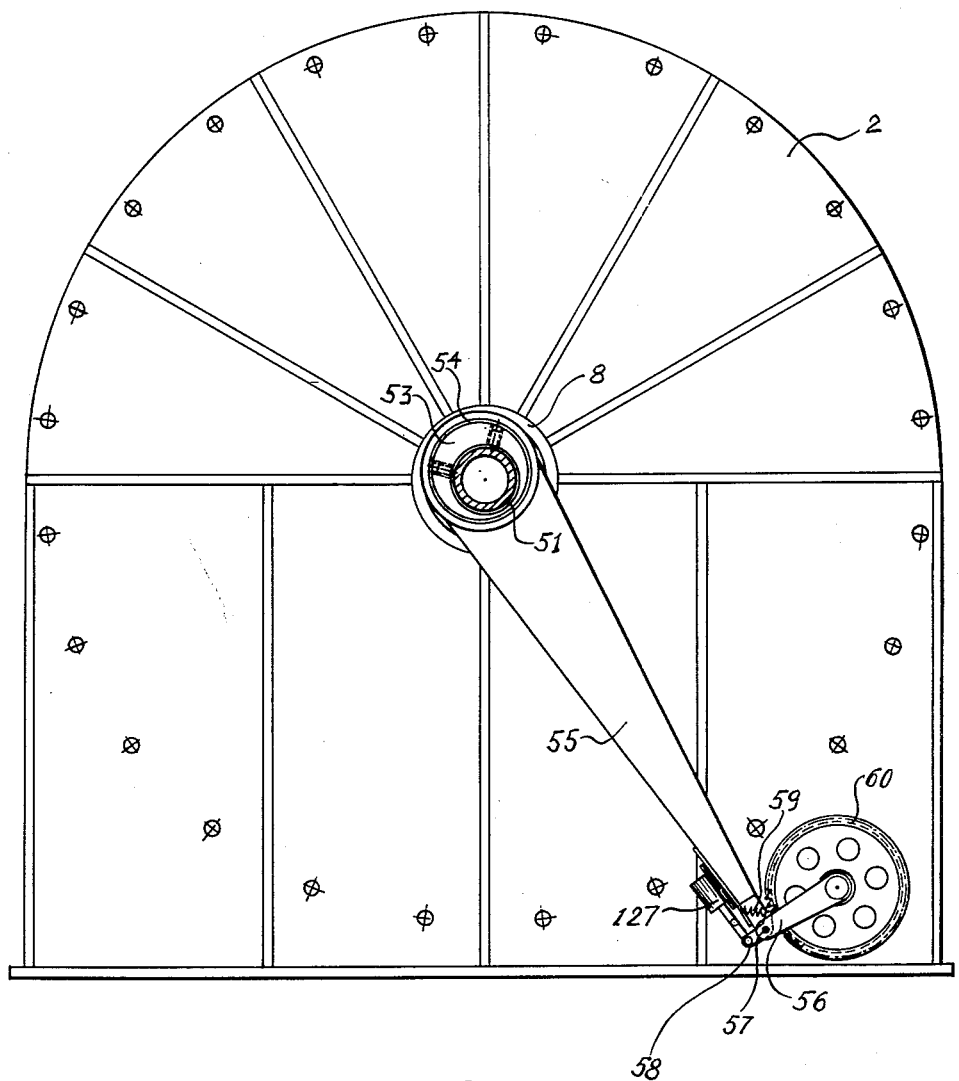
FIGURE 9 is a side elevation of the chain take-up mechanism.
Figure 10:
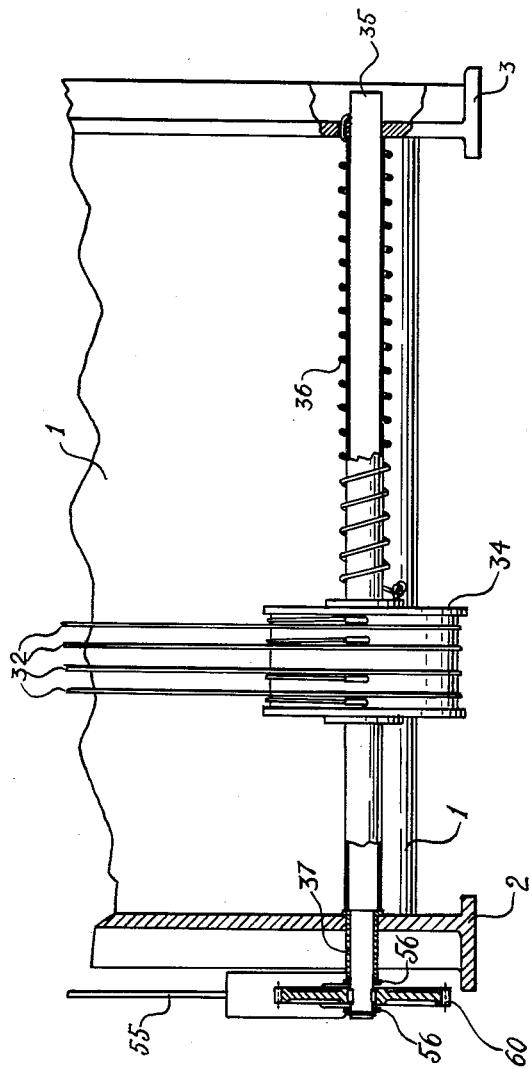
FIGURE 10 illustrates the cable drum mechanism for the chain take-up mechanism.

In order to decrease the pitch circle of the chain track by one chain link at one time, a strong pull must be applied to the free end of the chain 24 up to the point where the pawl 46 contacts and catches the next following tooth of the ratchet shaft 44 and then immediately becomes released in order to reset a new true pitch at the chain interruption, resulting in a slight slowing down of the auto rotation of the planetary shaft 71. The said pull is applied to the free end of the chain 24 by the cables 32 (FIGURES 3 and 10), which are connected to and more fully wound around the cable drum 34. As best shown in FIGURE 9, it will be noted that at the rear end of the cable drum shaft 35, which projects through the housing cover 2, a spur gear 60 is attached with a pair of swing levers 56 pivoted on the shaft and adjacent both faces of said spur gear 60. The connecting rod 55 with a pressed-in sleeve bearing 54 is slipped over the eccentric 53 fixed to the outer rear end of the main shaft 51. The free ends of the connecting rod and the swing levers 56 as well as the pawl 58 are linked together by the pivot pin 57. The pawl 58 is released from the spur gear 60 by the release spring 59, which is attached to both the pawl and the connecting rod. To apply the necessary pull to the chain, the pawl 58 must be engaged with the spur gear 60 against the tension of the release spring 59, and this can be accomplished either manually or by a solenoid 127 attached to the connecting rod 55 (FIGURE 9). When the connecting rod during operation moves upwardly, caused by the eccentric, the pawl then will rotate the spur gear 60 clockwise to a predetermined degree and the cable drum 34 will be rotated accordingly applying the necessary pull to the chain 24 by means of the cables 32. When the connecting rod 55 swings downwardly, the chain is released and the pawl 46 of the chain feed mechanism 38 in FIGURE 3 will automatically set the new true pitch at the interruption of the chain track 24.

The auto rotation of the planetary shaft 71 of the primary planetary transmission which varies from 480 to 960 r.p.m., according to the change of the chain track diameter is then transmitted to the planetary shaft 80 of the secondary planetary transmission by means of the chain drive illustrated in FIGURE 4. The change in the distance between the center lines of the two planetary shafts 71 and 80 caused by the movement of the shaft 71 by reason of the different pitch diameter of the chain track 24 is taken care of by the chain tightener assembly 91 (FIGURE 4). The helical spring 94 in the tubular housing connected with the idler arm 92 forces the idler fork 95 with the idler sprocket 96 outwardly and keeps the chain 99 taut.

The satellite carrier 77 of the secondary planetary transmission is connected to the main shaft 51 and rotates also at a constant speed of 120 r.p.m. about the center of the transmission and the planetary shaft 80 connected with the planetary shaft 71 by means of the chain drive as shown in FIGURE 4 rotates also with speeds between 480 to 960 r.p.m., while the counter shaft 101 connected with the planetary shaft 80 by means of the two engaged spur gears 89 and 104 rotates with somewhat higher speeds in a direction opposite to that of the planetary shaft 80, providing for an accelerated reverse speed range.

By means of the selector key 120 any one of the sprockets 110, 111, 112 and 113 can be drivingly connected with the output shaft 108. For that purpose the selector key 120 is to be moved inwardly or outwardly up to the key boss snapped into the keyway of the selected sprocket.

As illustrated in FIGURES 1A and 1B the sprocket 110 is connected with the output shaft 108. Under consideration of the gear ratios, the variation of the pitch diameter of the chain track 24 as well as the planetary effect of the transmission, this results in a low speed range varying from zero to 120 r.p.m. in the output pulley 121. The connection of the sprocket 111 to the output shaft 108 provides a medium speed range of from 120 to 360 r.p.m. The sprocket 112 coupled to the output shaft results in a high speed range of from 360 to 840 r.p.m. and the connection of sprocket 113 to the output shaft provides a reverse speed range of from 1220 to 2320 r.p.m.

The adjustment of the chain track from its smallest to its largest pitch diameter and back takes place after the planetary sprocket 72 just passed the interruption point in the chain 24.

It will be evident that herein is provided a variable speed transmission which can produce any desired output speed with a smooth acceleration to maximum speed and similar deceleration for any character of load. Adjustment can be made for any practical number of positive drive stable speeds and those adjustments can be made during operation of the variable speed transmission and under load.

Load shocks are relieved between resiliency of the chain drives incorporated in the unit and all operating parts are amply lubricated by the maintenance of an oil bath in the housing and liberal use of anti-friction bearings assure a high efficiency of the transmission.

Figure 2:
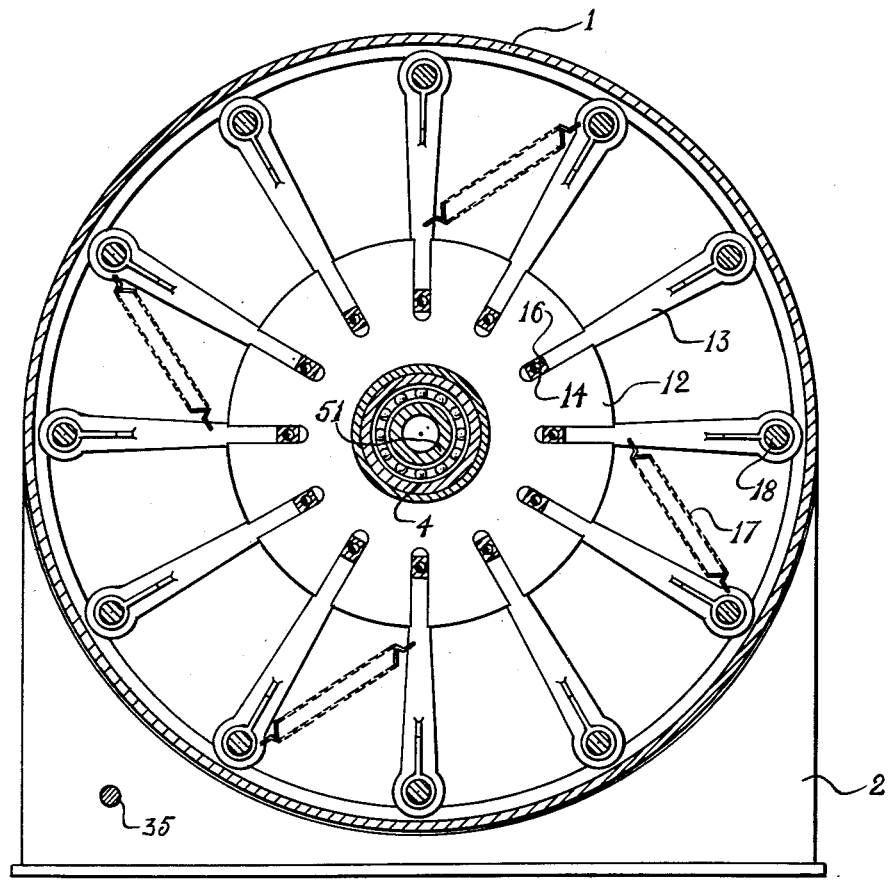
FIGURE 2 is a section taken on the lines 2—2 of FIGURES 1A and 1B, illustrating more particularly the controlling mechanism.
Figure 11:
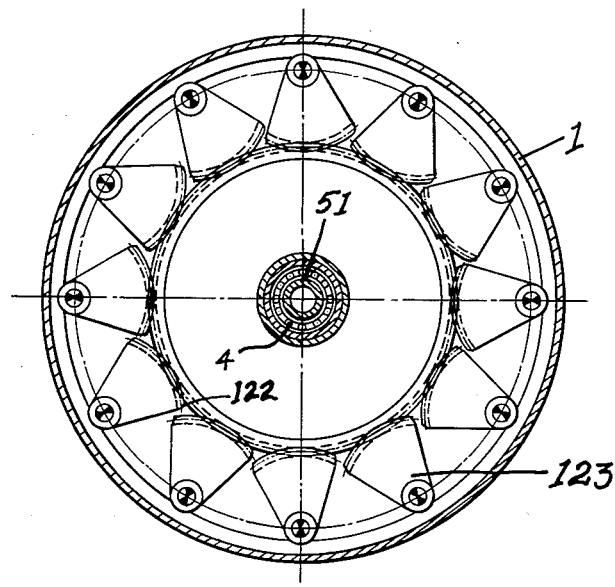
FIGURE 11 illustrates a slightly modified form of the invention and relates more particularly to a substitution form of the controlling mechanism shown in FIGURE 2.

In the modification as shown in FIGURE 11, a control spur gear 122 and a plurality of gear sectors 123 can be utilized to replace the controlling mechanism as shown in FIGURE 2. This modification provides for an easier assembly of the control mechanism and eliminates the friction due to the movement of the slides 16 in their slots during adjustment of the transmission.

Figure 12:
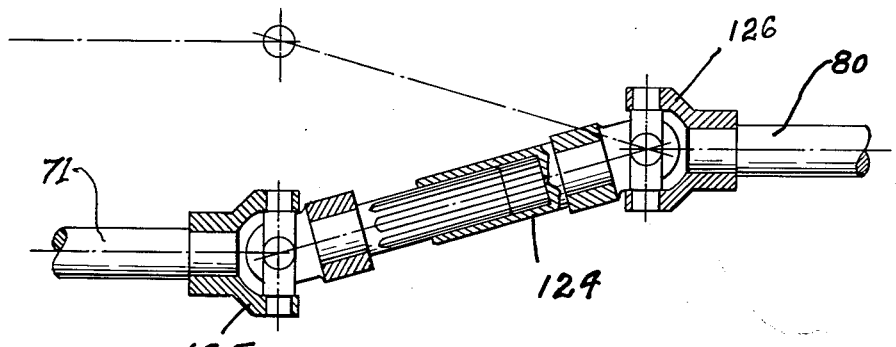
FIGURE 12 illustrates another form of gear which can be employed in the mechanism of this invention.

In a further modification as shown in FIGURE 12, a connection between the planetary shaft 71 with the planetary shaft 80 can be established by means of a telescoping splined shaft 124 and two universal joints 125 and 126. This would eliminate the connecting chain drive of FIGURE 4 together with the sprockets 73 and 85, the chain 99 and the chain tightener assembly 91, but produces a considerable increase in the overall length of the drive.

I am aware that many changes may be made and numerous details of construction may be varied throughout a wide range without departing from the principles of this invention, and I, therefore, do not propose limiting the patent granted hereon otherwise than as necessitated by the prior art.

I claim as my invention:

1. A variable speed transmission comprising a housing, a power input shaft, a power output shaft in alignment with the input shaft, said shafts comprising concentric tubes and a variable speed mechanism operatively connecting both shafts in the housing, said variable speed mechanism comprising a circular chain track concentric to the input shaft and constituting an internal toothed wheel featuring a changeability of its pitch diameter, that changeability resulting from the takeup of respective feeding chain links into and out of the chain track circle, a controlling assembly assuring the concentricity, centricity and tautness of said circular chain track, a primary planetary transmission consisting of a double knee lever mechanism keyed to the input shaft, a planetary shaft assembly turnably supported in bearings at the free ends of said double knee levers, said planetary shaft assembly including sprockets secured on said planetary shaft, one of said sprockets engaging the circular chain track and a counterweight for the planetary shaft assembly, a secondary planetary transmission, comprising a satellite carrier also fixed to the input shaft, a secondary planetary shaft assembly turnably supported in bearings at one end of said satellite carrier, said secondary planetary shaft assembly including a planetary shaft, a plurality of sprockets and a spur gear fixed on the shaft, the spur gear engaging the spur gear of a countershaft assembly also turnably supported in bearings in said satellite carrier to reverse the direction of rotation of the secondary planetary shaft to provide for a reverse speed range of the transmission, a further sprocket fixed to said countershaft and a counterweight attached to the opposite end of said satellite carrier to counterbalance the secondary planetary shaft assembly as well as the countershaft assembly, a chain drive operatively connecting the primary and the secondary planetary shaft assembly, a plurality of sprockets turnably supported on the output shaft, said sprockets drivingly connected by chains with the corresponding sprockets of the secondary planetary shaft assemblies and means to connect one or another of said sprockets operatively with the output shaft to provide for one or more speed ranges including a reverse speed range, the number of teeths of the sprockets being determined by the speed ranges desired for a certain application.

2. A variable speed transmission as described in claim 1, wherein the circular chain track comprises a plurality of pairs of support levers keyed at their outer ends to a corresponding plurality of pivot shafts mounted for rocking movement in ribs along the periphery of the housing, an integral protuberance at the inner end of each support lever, an arcuate leaf spring rockably mounted on each protuberance, said leaf springs juxtaposed in overlapping relationship to form a pair of circular tracks concentric with the input shaft, a chain tautly encircling said circular tracks, a chain feed mechanism mounted on one pair of said support levers, the fixed end of the chain being connected to said chain feed mechanism.

3. A variable speed transmission as described in claim 1, wherein the controlling mechanism comprises a slotted disc pivotally mounted in the housing concentric with the input shaft, a plurality of slides in the slots of the disc, a corresponding plurality of pairs of control levers pivotally connected to the slides at their inner ends and keyed to a corresponding number of pivot shafts at their outer ends, a plurality of springs connected to the control levers and the housing pulling said control levers constantly in one direction, the spring tension being controlled by the slotted disc and transmitted by the positive drive connection over said pivot shafts to the plurality of said support levers and as far as all levers, the control levers as well as the support levers are fixed in the proper angular relationship to the pivot shafts, the inner ends of said support levers are located on one concentric circle about the input shaft respectively move on such concentric circles, assuring the centricity and concentricity of the chain track and the tautness of the chain.

4. A variable speed transmission as described in claim 1, wherein the chain feed mechanism comprises side plates pivotally connected to one pair of said support levers, the fixed end of said chain connected by pivot pins and pin blocks to the other end of the side plates, a ratchet shaft turnably supported in the side plates, a spring loaded pawl pivotally mounted in the side plates engaging the ratchet shaft and assuring a proper pitch relationship between the fixed and the free end of the chain at the interruption point, a feed sprocket fixed at each end of said ratchet shaft, the free end of the chain after encircling the chain tracks engaging said feed sprockets and two rocker arms clamped to the protruding ends of said pawl and means to lift said pawl to allow the feeding of chain links into the chain track.

5. A variable speed transmission as described in claim 1, wherein a chain take-up mechanism is provided to take-up chain links from the chain track, said chain take-up mechanism comprising an eccentric secured to the input shaft, a connector arm encompassing said eccentric with one end and pivotally connected to swing levers at the other end, said swing levers pivotally mounted on a cable drum shaft, said shaft turnably supported in the housing covers, a spur gear secured to said cable drum shaft, a pawl pivotally mounted about the joint of said connector arm and swing levers, a release spring for said pawl and means to engage said pawl into said spur gear to turn said cable drum shaft a predetermined angle during the downward movement of said connector arm caused by the eccentric, a cable drum secured on said cable drum shaft, a plurality of cables connected to the cable drum with one end and with their other ends connected to the free end of the chain of the circular chain track and a preload spring for the cable drum to keep the cables and the surplus chain beyond the circular track taut, the surplus chain and the cables being guided over idler sprockets and bushings turnably mounted on the pivot shafts.

6. A variable speed transmission as described in claim 1, wherein a chain drive is provided to connect operatively the primary and the secondary planetary shaft assemblies, said chain drive comprising a chain encompassing and engaging the end sprocket of the primary planetary shaft, the end sprocket of the secondary planetary shaft and the idler sprocket of a chain tightener assembly, which includes an idler sprocket turnably supported in a spring loaded idler fork, a spring housing attached to one of a pair of idler arms, said idler arms pivotally supported on the inner ends of both planetary shafts and pivotally connected with each other at their free ends, said chain tightener assembly compensating for the relative movement of one planetary shaft to the other in keeping the chain taut.

References Cited in the file of this patent
UNITED STATES PATENTS

| | | |
|---|---|---|
| 541,483 | Hartness | June 25, 1895 |
| 874,563 | Baulanger | Dec. 24, 1907 |
| 1,100,747 | Krauss | June 23, 1914 |
| 2,101,845 | Fraser | Dec. 14, 1937 |
| 2,582,620 | Colucci | Jan. 15, 1952 |
| 2,641,144 | Schneider | June 9, 1953 |
| 2,852,954 | Hobbs | Sept. 23, 1958 |

FOREIGN PATENTS

| | | |
|---|---|---|
| 15,229 | Great Britain | Aug. 16, 1916 |
| 854,301 | Germany | Nov. 4, 1952 |